United States Patent
Comaskey

(10) Patent No.: US 6,829,257 B2
(45) Date of Patent: Dec. 7, 2004

(54) TRANSVERSE FLOWING LIQUID KERR CELL FOR HIGH AVERAGE POWER LASER Q-SWITCHING AND FOR DIRECT MODULATION OF HIGH POWER LASER BEAMS.

(75) Inventor: Brian J. Comaskey, Walnut Creek, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/350,740

(22) Filed: Jan. 23, 2003

(65) Prior Publication Data

US 2004/0146074 A1 Jul. 29, 2004

(51) Int. Cl.$^7$ .............................. H01S 3/00; H01S 3/04
(52) U.S. Cl. .......................................... 372/12; 372/34
(58) Field of Search ........................... 372/98, 106, 51, 372/53, 59, 27, 12, 34–36

(56) References Cited

U.S. PATENT DOCUMENTS

| | | |
|---|---|---|
| 3,563,631 A | 2/1971 | Sledge |
| 3,675,022 A | 7/1972 | Nelson et al. |
| 3,777,208 A * | 12/1973 | Ryason ................. 313/231.71 |
| 3,941,453 A | 3/1976 | Kruger |
| 4,053,763 A | 10/1977 | Harney |

OTHER PUBLICATIONS

Velsko, S. P., et al., "100 W Average Power at 0.53 μm by External Frequency Conversion of an Electro–Optically Q–switched Diode–Pumped Power Oscillator," American Institute of Physics, vol. 64 (23), Jun. 6, 1994, pp. 3086–3088.

Ebbers, C. A., "Beta Barium Borate a an Electro–Optic Material for High Power Lasers," SPIE, vol. 968, Ceramics and Inorganic Crystals for Optics, Electro–Optics, and Non-linear Conversion, 1988, pp. 66–68 (no month available).

Mocker, Hans W., "Characteristics of a λ/2 Kerr Cell Ruby Oscillator for Use as an Optical Radar (Lidar)," Applied Optics, vol. 5, No. 11, Nov. 1966, pp. 1829–1831.

Balashov, I. F., et al., "Generation of Microsecond Pulses in a Ruby Laser," Soviet Physics—Technical Physics, vol. 13, No. 5, Nov. 1968, pp. 699–700.

Goodno, G. D., et al., "Investigation of β–BaB204 as a Q Switch for High Power Applications," Applied Physics Letters, vol. 66, No. 13, Mar. 27, 1995, pp. 1575–1577.

Filippini, J. C., "Kerr Cell Light Modulator With Crossed Fields," Applied Optics, vol. 14, No. 12, Dec. 1975, pp. 3007–3011.

Weaver, L. F., et al., "Multikilowatt Pockels Cell for High Average Power Laser Systems," J. Appl. Phys., vol. 68, No. 6, Sep. 15, 1990, pp. 2589–2598.

Knudsen, A. W., "The Kerr Effect in Nitrobenzene—a Student Experiment," American Journal of Physics, vol. 43, No. 10, Oct. 1975, pp. 888–894.

\* cited by examiner

*Primary Examiner*—Quyen Leung
(74) *Attorney, Agent, or Firm*—Michael C. Staggs; Alan H. Thompson

(57) ABSTRACT

A fluid flow concept is applied in an optical apparatus to define a high gain stand-off, fast electro-optical q-switch which is highly impervious to high average power optical loads.

26 Claims, 2 Drawing Sheets

TRANSVERSE FLOWING LIQUID KERR CELL FOR HIGH AVERAGE POWER LASER Q-SWITCHING AND FOR DIRECT MODULATION OF HIGH POWER LASER BEAMS.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates generally to an apparatus and method for modulating the phase of a polarized beam and more particularly, to an apparatus and method for minimizing or eliminating thermally induced optical distortion in a Kerr Cell by introducing a transversely flowing electro-optically active medium.

2. State of Technology

Laser Q-switching, (i.e., high gain laser switching) may be achieved via acousto-optical (AO) switches, Pockels cells, bleachable crystals and moving mirrors. Bleachable Q-switches operate upon absorption principles and do not scale for high average power laser systems. Mechanical switches are slow transition switches that produce higher losses and longer pulses and have serious tolerance, alignment, and reliability issues. AO devices are capable of being used in high average power Q-switched laser systems but do not hold off high gain values and have much slower transition times than electro-optic switches. This results in long pulses of relatively low pulse energy. Thus, as the average power increases for such systems, residual absorption will eventually manifest itself as spatial variations in the index of refraction and thermally induced birefringence of the AO media. Pockels cells are popular as electro-optic Q-switches but limit oscillators to average powers of 10 Watts. Above this average power, strong thermal-optical lensing effects can destroy laser mode stability and gain stand-off.

Some of the earliest Q-switched lasers were based on liquid Kerr cells. When a non-moving exemplary dielectric medium, such as for example a nitrobenzene liquid, is enclosed in a cell, i.e., a container that is capable of passing an optical beam, and is subjected to a strong dc field by the use of a pair of electrodes and if an electromagnetic traveling wave is introduced into the medium, the plate field can have an effect on the index of refraction of the medium as seen by the traveling wave. This effect, known as the Kerr Effect, causes an effective birefringence in the liquid medium with the principle axis parallel and perpendicular to the plates and therefore induces polarization rotation in the traveling wave if the waves initial polarization is 45 degrees to the plate orientation. If such a device is put inside a laser cavity containing a polarizing element at 45 degrees to the plates and the plate voltage is switched, a q-switched laser pulse is produced. If such a cell is placed between predetermined polarizers, the cell coupled with the polarizers, i.e., a Kerr Modulator, is capable of amplitude modulation or beam shuttering or beam direction switching. If the traveling wave is polarized along an induced principle axis and a modulated voltage is applied to the plates, then the traveling wave will be phase modulated. If for this last case, a large DC voltage is applied to the plates as well as a smaller modulated voltage, then the phase modulation of the traveling wave will be linear with the modulated drive voltage. Though such a system has benefits such as ease of alignment, since with the fields off, it is not a birefringent medium, as are the solid state Pockels Cell crystals, low average power beam users prefer not handling nitrobenzene and worrying about seal leaks. However, such static and near static (i.e., in some cases low flow is used for filtering), liquid devices are capable of high laser oscillator gain stand-off, and various modulations of low average power light such as ultra fast shutters. Moreover, for both solid state and static liquid state electro-optical devices, high average power optical loads (e.g., up to a few hundred watts in advanced designs) induce thermo-optical distortions that are unacceptable for operation of such devices.

Accordingly, the present invention provides a solution for eliminating or minimizing thermo-optic effects, e.g., induced optical distortion, in Kerr cells to produce a simple, high gain, high average power Q-switch that is additionally capable of direct phase modulation of high average power beams.

SUMMARY OF THE INVENTION

Accordingly, the present invention provides an optical apparatus that is capable of minimizing thermally induced optical distortion by moving an electro-optically active medium into and out of a container via a circulation system.

Another aspect of the present invention is to provide an optical apparatus having at least one container arranged along an optic axis that is capable minimizing thermally induced optical distortion by transversely flowing an electro-optically active medium into and out of each of the containers via a circulation system.

Another aspect of the present invention is to provide at least a first and a second container arranged along an optic axis and adapted to receive and pass an input optical beam with a predetermined polarization. The apparatus includes at least one pair of electrodes positioned in each of the containers and arranged substantially parallel to the optic axis, a fluid introduced within the containers that is capable of electro-optical activity when subjected to the electrodes interposed electric field and a circulation system to produce a transverse flow of the fluid into an out of each container with respect to the input beam and adapted to counter-flow the fluid into and out of the second container with respect to the first container such that thermally induced phase errors are further minimized.

Another aspect of the present invention is to provide an optical method for: directing a beam having a predetermined polarization and direction to at least one container arranged along an optic axis and adapted to receive and pass the beam, transversely flowing a fluid capable of electro-optical activity into and out of each of the containers to minimize thermally induced optical distortion; and applying a predetermined electric field to the fluid in each container such that the liquid becomes electro-optically active.

Accordingly, the invention provides a high average power, high gain stand off q-switch that is beneficial in simplifying present high power pulsed laser systems and permitting the development of much larger high power pulsed laser systems. In addition, the present invention can be arranged external to a laser system and operated as an optical switch that is capable shuttering or redirecting very high power levels. The invention can also directly phase modulate an external beam to provide a fast polarization rotator at high average power levels or it can be configured to amplitude modulate the beam. Such a device is beneficial for material processing applications such as cutting, drilling, and laser shock peening.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

Figure 1:
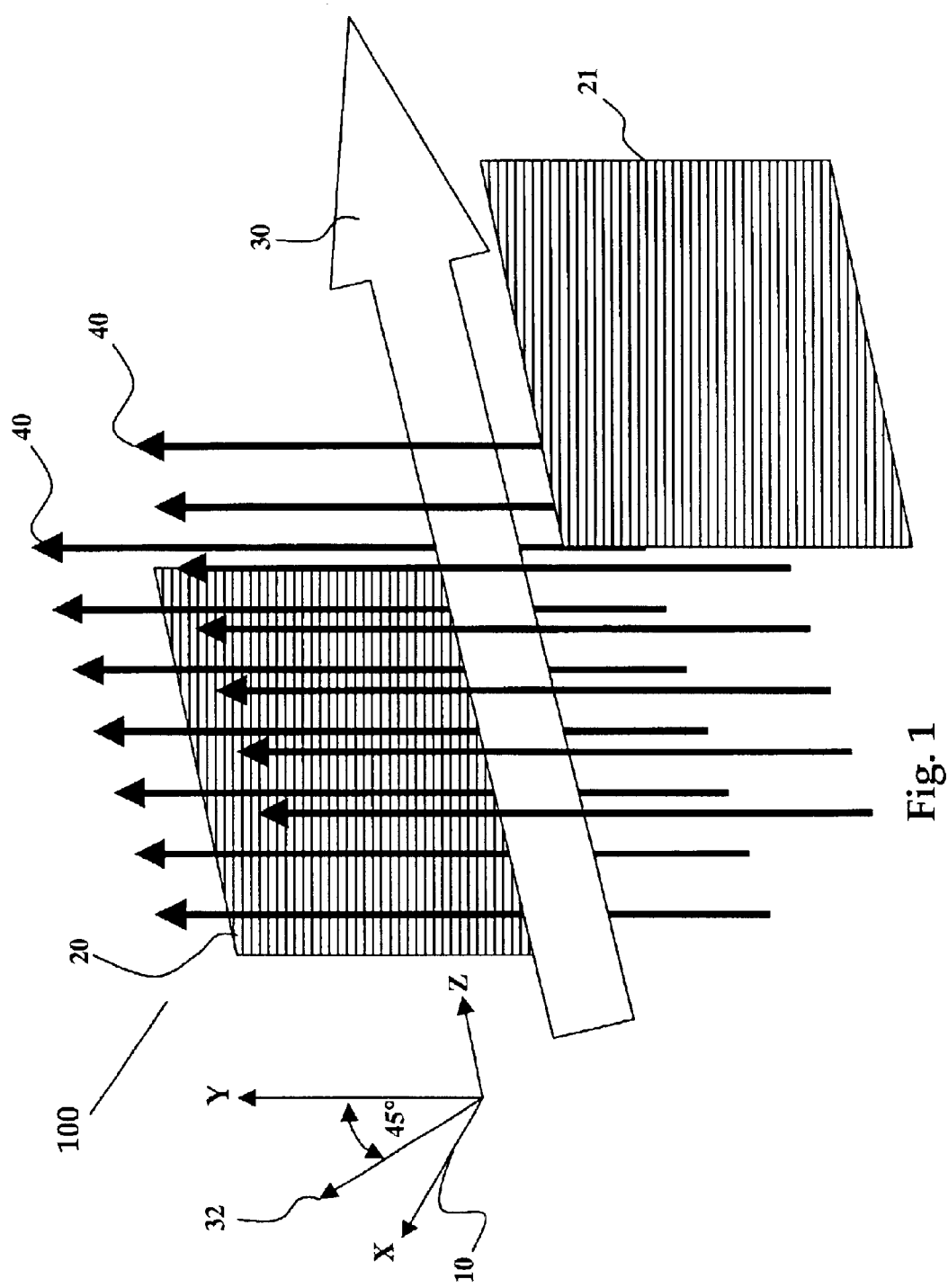
FIG. 1 shows a simple schematic of a Kerr cell with a transversely flowing electro-optically active fluid.

Referring now to the following detailed information, and to incorporated materials; a detailed description of the invention, including specific embodiments, is presented. The detailed description serves to explain the principles of the invention.

Unless otherwise indicated, all numbers expressing quantities of ingredients, constituents, reaction conditions and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical value, however, inherently contain certain errors necessarily resulting from the standard deviation found in their respective testing measurements.

General Description

The present invention provides an apparatus and method for producing a high gain stand-off, high average power, electro-optic shutter, by moving the electro-optically active medium, (i.e., the fluid or gas that exhibits double refraction when subjected to an electric dc field), transversely to the direction of the input electromagnetic wave.

Conventional Kerr cells typically employ a static molecular medium, e.g., a non-flowing electro-optically active medium that includes fluids, because the reorientation of the molecules of the particular medium produces a large change of index of refraction under an influence of an applied dc or ac electric field, i.e., the medium exhibits a large Kerr effect. Nitrobenzene is one such medium that exhibits such a large effect and although Nitrobenzene is toxic to breath, toxic to touch, and despite its property of being a powerful solvent, which makes container sealing problematic, the fluid is especially useful in the infrared spectral region between about 1 and about 10 microns.

The Kerr effect is temperature dependent, i.e., the Kerr effect decreases with an increase of temperature, and therefore it is beneficial that existing liquids that are used as the medium are only residually absorbing, i.e., for a predetermined wavelength, in order to minimize heating effects. However, the change in the index of refraction with respect to temperature is large enough in solid state media and is even larger in most liquids to create optical beam path cross-sectional differences of many waves for an input optical beam. Such beam path differences creates optical distortions to essentially render these devices ineffective as a Kerr cell when subjected to high power laser beams of greater than 10 watts average power.

The present invention provides a solution for temperature related optical distortions in Kerr cell devices by rapidly flowing the electro-optically active liquid medium transversely to the lasing axis. Surprisingly, such a simplistic transverse flow technique, for example, by a transverse laminar flow with respect to the beam propagation direction, provides unexpectedly superior results in minimizing thermo-optic distortions caused by the interacting optical beam. It is desirable that a rate observing the relationship of at least about 14,000 Watts per GPM of flow is implemented when nitrobenzene is introduced as the Kerr liquid. However, higher or lower flow rate values may occur with different Kerr fluids, wavelengths, beam sizes, and as a result of practical hardware constraints of a particular Kerr cell design.

Moreover, as the active fluid flows through the Kerr cell, it integrates waste heat and exits the flow region at a slightly higher temperature than the inlet. This difference, even if less than a degree centigrade, changes the optical path by many wavelengths of light. For uniform deposition of an input beam, the change in index is linear, causing a simple optical wedge to accumulate in the optical path.

It is possible to deal with the optical wedge problem by dividing the Kerr cell into two equal parts, placing them in series either internal or external to an optical cavity, and arranging the flow to be in opposite directions. The resulting optical wedges are equal and opposite, causing them to cancel to first order. This distortion is smaller than the original wedge and is a simple parabola in the direction transverse to the flow. Subject matter related to the removal of this residual distortion that is not canceled, is disclosed and claimed in the following commonly owned, U.S. patent application Ser. No. 6,339,608, which is incorporated herein by reference in its entirety: "Device for Wavefront Correction in an Ultra High Power Laser" by Earl R. Ault, Brian J. Comaskey and Thomas C. Kuklo.

Accordingly, such a transverse flow technique is beneficial in compensating induced thermo-optic effects to enable high gain stand-off, direct phase modulation, and fast electro-optical q-switching of high average power laser systems.

Specific Description

FIG. 1 shows a single Kerr cell apparatus embodiment of the present invention and is generally referenced by the numeral 100. With respect to a relative axis orientation 10 of (X, Y, Z), a pair of electrodes, such as stainless steel electrodes 20 and 21, provides an electric field (not shown) oriented substantially perpendicular to a traveling electromagnetic wave beam 30 directed along the Z axis and having an input polarization vector 32 oriented about 45 degrees to the Y axis. An electro-optically active medium 40, i.e., a fluid, such as for example nitrobenzene or $CS_2$, that becomes doubly refractive while under the influence of an electric field, is rapidly flowed in one or more containers (not shown) that comprise Kerr cells, in a substantially transverse direction, e.g., along the Y axis as shown in FIG. 1, with respect to beam 30. As one embodiment, medium 40 is capable of being flowed by a circulation system (not shown), e.g., a pumping system, but it is often desirable to rapidly flow medium 40 in a circulating closed loop arrangement (not shown). Although nitrobenzene is desirable as medium 40, any fluid capable of becoming optically uniaxially anistropic (i.e., exhibits double refraction) when under the influence of an electric field and that has the appropriate viscosities for flow rates that meet the present inventions specifications can also be employed. The structure and optical properties of additional exemplary fluids, usable in accordance with the present invention, are disclosed in U.S. Pat. No. 3,941,453, titled "Birefringent Compounds Used In Kerr Cells" by Kruger, the disclosure is herein incorporated by reference in its entirety. Such exemplary fluids, as detailed in the above captioned patent, include but is not limited to N,N dimethyltrifluoroacetamide phenyltrifluoromethylsulphone, N,N dimethyltrifluoromethylsulphonomide, N,N diethyltrifluoroacetamide, diethylbenzamide, and phenyltrifluoromethylsulphide. Such fluids enable the present invention to additionally operate in the visible and ultra-violet and have Kerr constants comparable with nitrobenzene.

Figure 2:
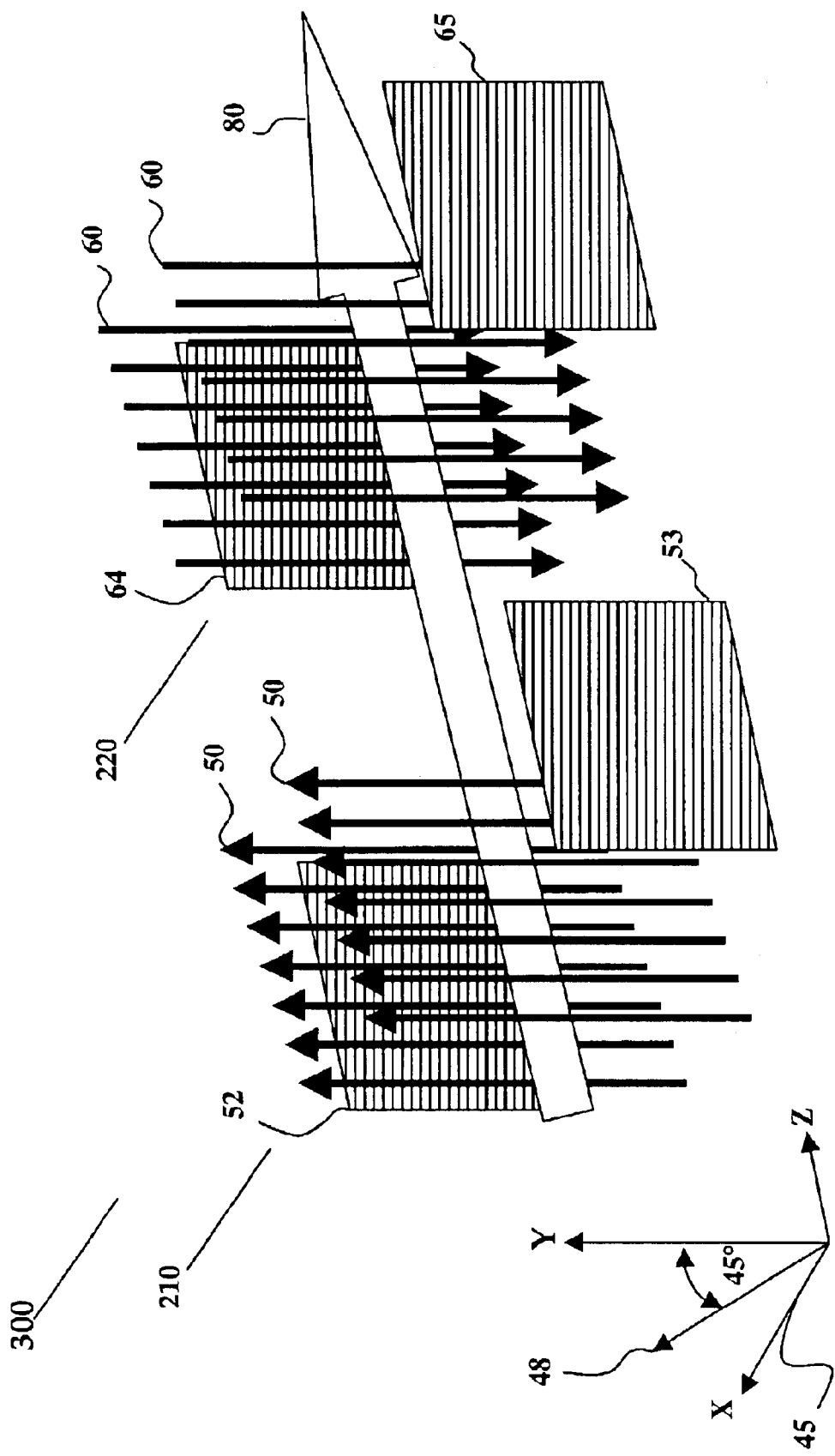
FIG. 2 shows a simple schematic of a second embodiment of the present invention having at least a pair of Kerr cells with a counter-flowing arrangement of the electro-optically active fluid in respective cells.

FIG. 2 shows another embodiment of the present invention and is generally designated as reference numeral 300. In this second embodiment, instead of a single Kerr liquid flow 40 direction in a single cell as shown in FIG. 1, the embodiment of FIG. 2 includes at least two Kerr cells 210 and 220, aligned in series along an optic axis, (e.g., the Z axis as shown by relative (X, Y, Z) axis orientation 45), such that a Kerr liquid counter flow 60 direction into and out of a cell 220, is oriented at about 180 degrees to a Kerr liquid flow 50 direction in cell 210. Such an arrangement further compensates for any thermally induced optical distortion due to heating and liquid pulsation effects induced by a traveling electromagnetic wave beam 80 within the interactive volume of cells 210 and 220. Included in the embodiment are electrode pairs 52 and 53 for cell 210 and electrode pairs 64 and 65 for cell 220 to provide a pair of interposed electric fields (not shown) to induce electro-optic activity in the Kerr liquid (shown as flows 50 and 60) within each cell 210, 220. The interposed electric fields (not shown) are each oriented substantially perpendicular the direction of beam 80 (i.e., the Z axis direction), with beam 80 additionally having a 45 degrees input polarization vector 48 with respect to flow directions 50, 60.

The embodiments of FIG. 1 and FIG. 2 can be configured within a laser oscillator and operated as a fast Q-switch with operating switching speeds having relatively large time frames ranging downwardly to desirable operating speeds of less than about 50 picoseconds, e.g., the rotational reorientation times for nitrobenzene and $CS_2$, and with the additional capability of high gain stand-off of up to 1000:1. In addition, the embodiments of FIG. 1 and FIG. 2 can be arranged external to a laser system and operated as an optical switch that is capable of redirecting power levels set approximately by the figure of merit specific to that wavelength, beam size, hardware configuration, and Kerr liquid, e.g., nitrobenzene. Such embodiments, when operated as an external device can additionally be directly phase modulated to provide a fast polarization rotator at high average power levels. Such a device is beneficial for applications such as material processing, i.e., cutting, drilling, and laser shock peening.

It should be understood that the invention is not intended to be limited to the particular forms disclosed. Rather, the invention is to cover all modifications, equivalents, and alternatives falling within the spirit and scope of the invention as defined by the following appended claims.

What is claimed is:
1. An optical apparatus, comprising:
   a container comprising a pair of electrodes and an electro-optically active medium; and
   a circulation system for rapidly moving the medium into and out of the container to minimize thermally induced optical distortion.
2. The apparatus of claim 1, wherein the medium further comprises a Kerr fluid that moves with a substantially transverse flow with respect to an input beam having a wavelength between about 350 nm and about 10 microns, said beam additionally having a predetermined polarization and direction.
3. The apparatus of claim 2, wherein the flow includes a laminar flow.
4. The apparatus of claim 2, further comprising at least a first and a second container, wherein the flow into and out of the first container has a counter-flow direction with respect to a flow direction into and out of the second container such that thermally induced phased errors are further minimized.
5. The apparatus of claim 2, wherein the polarized input beam is capable of being directly phase modulated.
6. The apparatus of claim 2, wherein an interposed electric field generated by the electrodes, produces optical activity in the Kerr fluid therein.
7. The apparatus of claim 6, wherein the electric field is substantially perpendicular to the beam.
8. The apparatus of claim 1, wherein an interposed electric field generated by the electrodes produces an optical switch capable of a switching speed down to less than about 50 picoseconds.
9. The apparatus of claim 1, wherein the electro-optically active medium is capable of a high gain stand-off of up to 1000:1.
10. The apparatus of claim 2, wherein the Kerr fluid includes nitrobenzene.
11. The apparatus of claim 10, wherein a minimum traverse flow rate is set by a power load to a flow rate figure of merit of at least about 14,000 Watts per GPM.
12. The apparatus of claim 2, wherein the Kerr fluid is selected from the group consisting of N,N dimethyltrifluoroacetamide phenyltrifluoromethylsulphone, N,N dimethyltrifluoromethylsulphonomide, N,N diethyltrifluoroacetamide, diethylbenzamide, and phenyltrifluoromethylsulphide.
13. An optical apparatus, comprising:
   at least one container arranged along an optic axis, wherein each said container comprises a pair of electrodes and an electro-optically active fluid; and
   a circulation system, capable of producing a transverse rapid flow of the fluid into and out of each said container with respect to an input beam to minimize thermally induced optical distortion, said beam further comprising a predetermined polarization and direction.
14. The apparatus of claim 13, wherein the flow includes a laminar flow.
15. The apparatus of claim 13, wherein the input beam is directly phase modulated.
16. The apparatus of claim 13, further comprising a first and a second container arranged in series, wherein the flow into and out of the first container has a counter-flow direction with respect to a flow direction into and out of the second container such that thermally induced phased errors are further minimized.
17. An optical apparatus, comprising:
   at least a first and a second container arranged in series along an optic axis and adapted to receive and pass an input optical beam, said beam having a predetermined polarization, at least one pair of electrodes positioned in each of the containers and arranged substantially parallel to the optic axis, a fluid introduced within the containers, wherein the fluid is capable of electro-optical activity when subjected to the electrodes interposed electric field; and a circulation system adapted to produce a transverse flow of the fluid into and out of each container with respect to the input beam and adapted to counter-flow the fluid into and out of the second container with respect to the first container such that thermally induced optical distortion are further minimized.

18. An optical method, comprising:

directing a beam having a predetermined polarization and direction to at least one container arranged along an optic axis and adapted to receive and pass the beam, transversely flowing a fluid capable of electro-optical activity into and out of each of the containers to minimize thermally induced optical distortion; and applying a predetermined electric field to the fluid in each container such that the fluid becomes electro-optically active.

19. The method of claim 18, wherein the fluid includes a Kerr liquid.

20. The method of claim 19, wherein the Kerr liquid is Nitrobenzene.

21. The method of claim 18, wherein the flowing step includes counter-flowing a Kerr liquid into and out of a first container with respect to a flowing Kerr liquid into and out of a second container such that thermally induced optical distortion are further minimized.

22. The method of claim 18, wherein the flow includes a laminar flow.

23. The method of claim 20, wherein a minimum transverse flow rate is set by a power load to a flow rate figure of merit of at least about 14,000 Watts per GPM.

24. The method of claim 18, wherein the beam further includes an optical laser beam.

25. The method of claim 18, wherein the beam is polarized and is further capable of being directly phase modulated.

26. The method of claim 20, wherein the applied electric field produces an optical switch capable of a switching speed down to less than about 50 picoseconds.

* * * * *